March 20, 1962  H. C. ALLSTON  3,025,677
FLOOD GATES

Filed Dec. 11, 1956  2 Sheets-Sheet 1

Hugh C. Allston
INVENTOR.

March 20, 1962  H. C. ALLSTON  3,025,677
FLOOD GATES
Filed Dec. 11, 1956  2 Sheets-Sheet 2
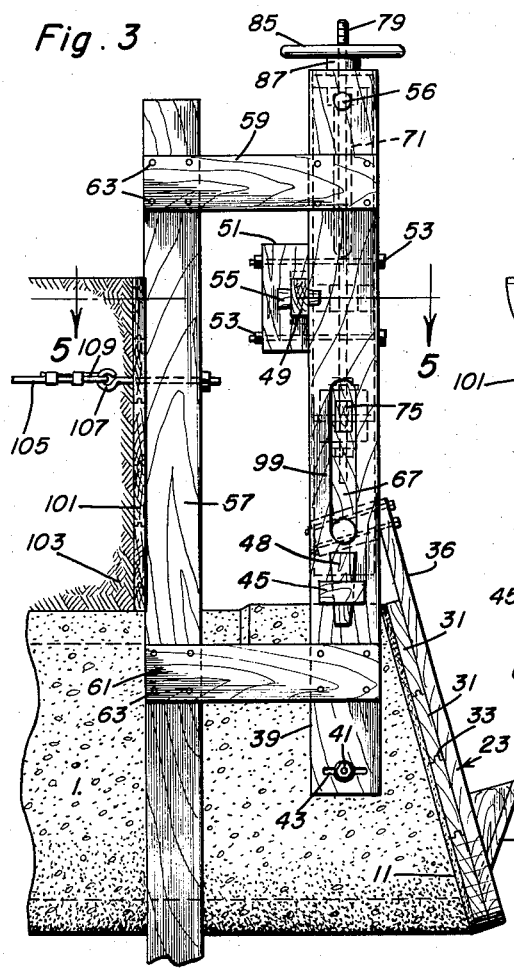
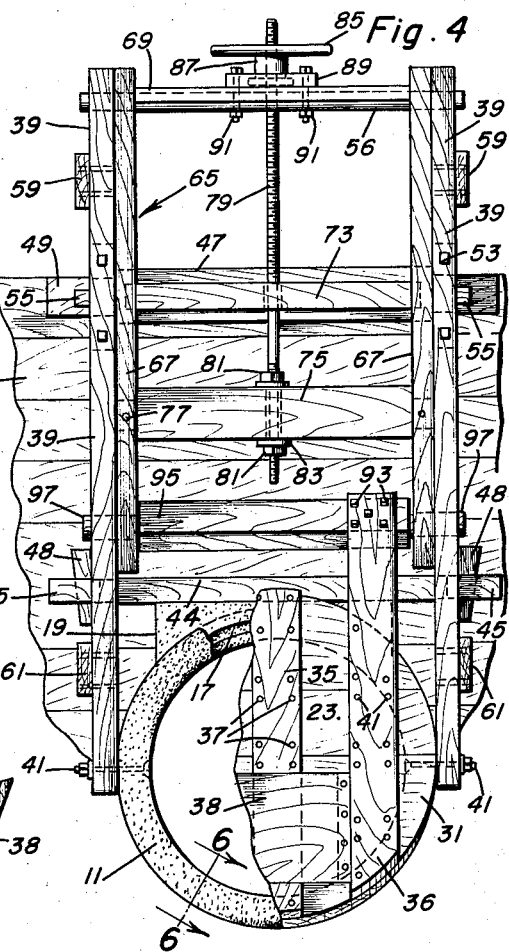
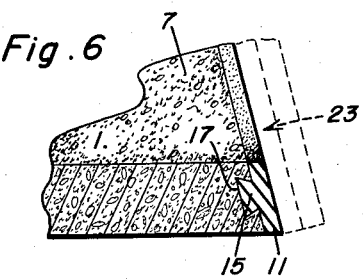
Hugh C. Allston
INVENTOR.

3,025,677
FLOOD GATES
Hugh C. Allston, Yonges Island, S.C., assignor of fifty percent to W. O. Hanahan, Charleston Heights, S.C.
Filed Dec. 11, 1956, Ser. No. 627,626
1 Claim. (Cl. 61—28)

My invention relates to improvements in flood gates and irrigation trunks for use in an irrigation ditch at the bank of a tide water supply such as a stream or river, for irrigating and draining rice fields and the like.

The primary object of my invention is to provide improved means for mounting a pair of flood gates on an irrigation trunk at opposite ends of the trunk for raising and lowering without swinging to open and close the ends of the trunk when the gates are under back pressure by a head of tide or drainage water, and whereby to render opening and closing of such gates easy when under such pressure, together with improved means for swingably mounting the gates for automatic opening of either in its lowered closed position when the other is raised into open position as when irrigation or drainage water is being admitted to the trunk to flow therethrough.

Another object is to provide for tightly sealing the ends of the trunk when the gates are closed and under pressure by a head of water.

Other and subordinate objects together with the precise nature of my improvements will become readily apparent when the following specification is read in conjunction with the accompanying drawings in which:

FIGURE 3 is an enlarged fragmentary view in side elevation partly in section of the trunk and one of the gates lowered and closed;

FIGURE 4 is an enlarged fragmentary view in front elevation of the same;

FIGURE 5 is a fragmentary view in horizontal section taken on the line 5—5 of FIGURE 3; and FIGURE 6 is a further enlarged view in longitudinal section taken on the line 6—6 of FIGURE 4.

Figure 1:
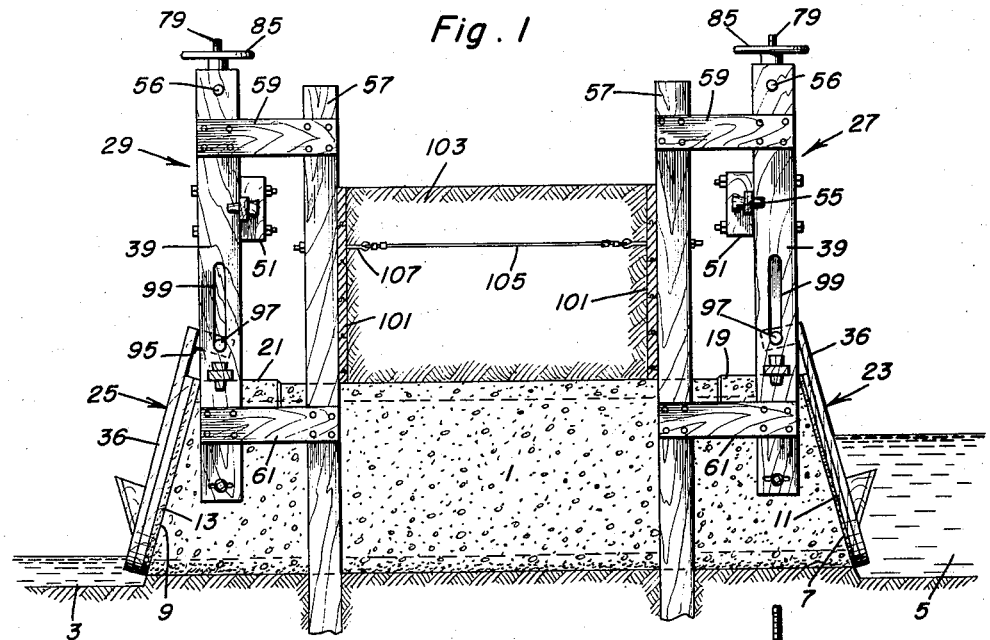
FIGURE 1 is a view in side elevation partly in section of my improved flood gates and irrigation trunk arranged in an irrigation ditch and illustrating both gates lowered and closed.

Referring to the drawings by numerals, the trunk with which my invention is concerned comprises a concrete or cement conduit 1, preferably although not necessarily cylindrical, for fastening horizontally in any suitable manner in an irrigation ditch 3 leading from a bank of a tide water stream, or the like 5 with one end, hereafter designated a front end 7, adapted to be opened to tide water from the stream and its other end, hereinafter designated its rear end 9, adapted to be opened into the ditch 3.

According to my improvements the front and rear ends 7, 9 are each provided with an annular water sealing gasket 11, 13 fitted flat thereagainst and held thereto by a dove tail rib 15 therein pressed into a dovetail annular groove 17 in the end of the conduit, as shown in FIGURES 4 and 6 with respect to the gasket 13 and front end 7, and front and rear flat top bosses 19, 21 are formed on top of the conduit 1 at its front and rear ends 7, 9, all for a purpose presently apparent.

A pair of circular front and rear gates 23, 25 are provided for opening and closing the front and rear ends 7, 9 and a pair of front and rear mountings 27, 29 therefor adjacent said ends. The gates 23, 25 are duplicates as are also the mountings 27, 29 and therefore a description of one gate and its related mounting will suffice.

Each gate 23, 25 comprises a plurality of transverse planks 31 fitted together by tongue and groove connections 33, a vertical central bar 35 nailed thereto as at 37 and a pair of vertical hanger bars 36 nailed, as at 41, to said planks at opposite sides of the central bar 35 and which extend above the conduit 1. A bottom front trough 38 on each gate 23, 25 for containing lead weights or the like, not shown, is provided to facilitate closing of the gate. The gates 23, 25 when closed incline outwardly and downwardly against the ends 7, 9 which are similarly inclined.

The mountings 27, 29 each comprise a pair of opposite upright bars 39 straddling the conduit 1 in parallel relation and upstanding therefrom and which are bolted at their lower ends, by bolts 41, extending through transverse slots 43 in said bars 39 for adjustment of the bars 39 longitudinally of the conduit in attaching the mounting to the conduit.

A lower removable cross bar 44 having reduced ends 45 extending through said bars 39 is provided to seat on the boss 19, 21 at the related end of the conduit 1 and establish the vertical position of the bars 39 relative to said conduit 1, as well as to connect said bars 39 together. Removable wedges 48 in said ends 45 outwardly of bars 39, retain said cross bar 44 in place.

An upper cross bar 47 for connecting the bars 39 has reduced ends 49 extending through apertured blocks 51 bolted as at 53 to rear edges of said bars 39. Removable wedges 55 in said reduced ends 49 retain the cross bar 47 in place. A removable stationary cross shaft 56 slidably extends through and connects the upper ends of the bars 39.

A pair of opposite stabilizing stake bars 57 straddling the conduit 1 in the rear of the bars 39 are driven into the ground to extend above the conduit 1 in parallel relation and are connected to the bars 39 by upper and lower horizontal bars 59, 61 nailed as at 63 to the bars 39, 57. The stake bars 57 engage opposite sides of the conduit 1 to keep said conduit from rolling out of position.

The bars 39, 44, 47 and the shaft 56 form a frame upstanding above the conduit 1 and of which the bars 39 form side guide bars for a vertically slidable gate raising and lowering frame 65 fitting between said bars 39 above the cross bar 44 and in front of the cross bar 47.

The gate raising and lowering frame 65 comprises a pair of opposite vertical side bars 67 slidably engaging the bars 39. An upper stationary cross bar 69 of inverted channel form extends between the upper ends of the bars 67 above and straddles the shaft 56. The shaft 56 extends through vertical guide slots 71 in the upper ends of the bars 67 whereby said frame 65 is guided against forward or rearward tilting at its upper end. Upper and lower intermediate cross bar 73, 75 mortised at their ends into the side bars 67 connect the latter and may be secured thereto by nails as at 77.

Screw feed means for raising each frame 65 comprises a vertical threaded shaft 79 rising centrally in the frame 65 and rotatably through the intermediate and upper cross bars 73, 75 and the shaft 56 and bar 69 and fixed at its lower end in the lower bar 75 by nuts 81 and washers 83. A hand wheel 85 threaded on the upper end of the shaft 79 above the bar 69 has a hub 87 journaled and seated in a bearing 89 bolted as at 91 on top of the bar 69. By rotating the hand wheel 85 in opposite directions the gate raising and lowering frame 65 may be raised or lowered. The bar 69 seats on the shaft 56 to limit lowering of said frame 65 at its upper end.

Each gate 23, 25 is hingedly suspended from the frame 65 of its associated mounting 27, 29, as the case may be, for slidably raising or lowering thereby to open or close its associated end of the conduit 1 or for swinging outwardly of the conduit 1 upwardly or downwardly from and into seated position on the gasket 11 or 13 of its associated end of the conduit. For this purpose hanger bars 36 of the gate are bolted as at 93 to a transverse rocker bar 95 in the lower end of the frame 65 which has reduced end trunnions 97 rotatable and vertically slidable in vertical slots 99 in the bars. The trunnions 97 guide vertical movement of the frame 65 at its lower end and seat against the upper and lower ends of the slots 99 to limit raising and lowering of said frame at its lower end and raising and lowering of said gate by its frame.

Vertical walls 101 of tongue and groove planks are suitably fixed on the confronting edges of the pairs of stake bars 57 to hold earth fill 103 therebetween for holding the conduit 1 in the ditch 3.

Tie cables 105 extend between the stake bars 57 and connect the same together in pairs of opposite sides of the conduit and are detachably secured to the stake bars 57 by eye bolts 107 on looped ends 109 of said cables.

The previously described planks, bars, and blocks are all of creosoted wood for protection against rotting and warping.

Figure 2:
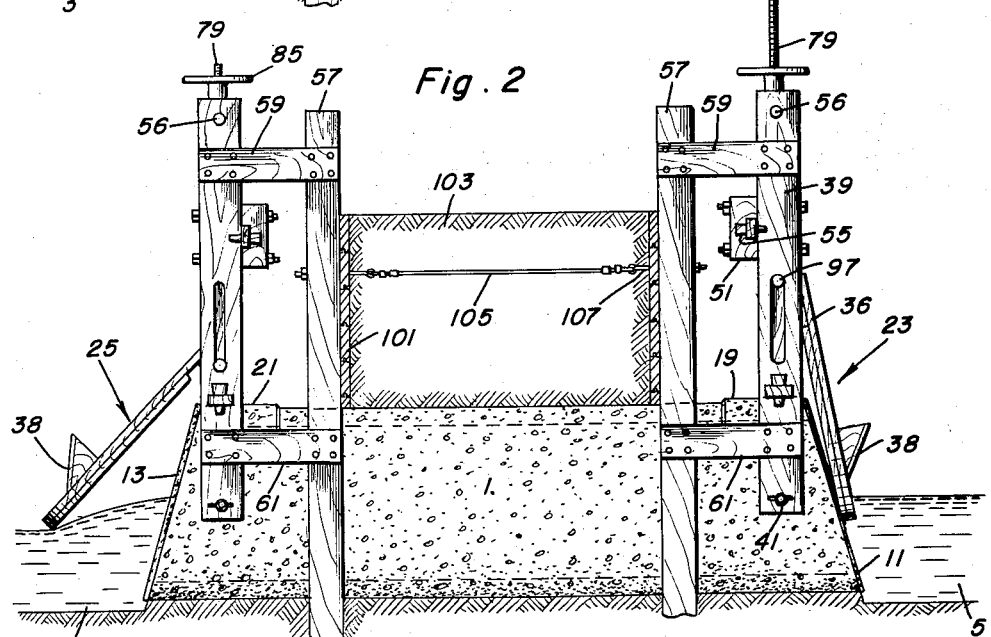
FIGURE 2 is a similar view illustrating one of the gates raised into open position to admit irrigation water into the trunk and the other gate automatically swung open when the water flows through the trunk.

The operation of my invention will be readily understood. When the frames 67 are lowered into their downward limit of movement, as best shown in FIGURE 1 the gates 23, 25 are slid downwardly on the gaskets 11, 13 and swung by gravity on the frames 67 into seated closed position thereon. When either frame 67 is raised, for instance as shown in FIGURE 2 with respect to the gate 23, the associated gate thereon is slid upwardly on its associated gasket into open position so that irrigation or drainage water, depending on which gate is raised may enter the conduit 1 and by pressure against the other gate swing said other gate open for flow of water through the conduit.

Because of the removable parts, and parts nailed and or bolted together and previously identified the gates 23, 25 and mountings 27, 29 may be readily disassembled for storage or transporting in a bundle and are readily put together for use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

In an irrigation flood gate, a cylindrical conduit for positioning horizontally in a ditch and having a downwardly and outwardly inclined end, a flat gate seating on said end to close the same, means pivotally mounting said gate for upward swinging movement about a horizontal axis extending transversely of said conduit and fixed relative to said gate into open position in response to pressure of water in the conduit against said gate and for upward sliding on said end into open position in opposition to pressure of water in a ditch seeking to enter said end and maintaining said gate closed, said means comprising a pair of upright side bars fixed to and rising from opposite sides of the conduit, a rocker bar extending across said conduit between said side bars, hanger bars suspending said gate from said rocker bar, end trunnions on said rocker bar journaled in and upwardly slidable in longitudinal slots in said side bars whereby said gate is upwardly swingable about the axis of said trunnions and vertically movable by upward movement of said rocker bar in said slots whose opposite ends comprise stops limiting vertical movement of said gate, a pair of cross connected slide bars for moving said rocker bar upwardly disposed between and guidingly and slidably engaging said side bars with lower ends in which said trunnions are journaled and having longitudinally slotted upper ends, a shaft extending transversely through the slots in said upper ends of the slide bars and fixed in the side bars for guiding said upper ends of the slide bars in upward movement of said slide bars wherein the latter are slidably guided for linear movement, and screw feed means for moving said slide bars upwardly.

References Cited in the file of this patent

UNITED STATES PATENTS

| | | |
|---|---|---|
| 490,137 | Corliss | Jan. 17, 1893 |
| 535,809 | Blanchard | Mar. 19, 1895 |
| 726,401 | Buttorff | Apr. 28, 1903 |
| 754,308 | Heidt | Mar. 8, 1904 |
| 853,168 | Garbe | May 7, 1907 |
| 1,087,243 | Kurz | Feb. 17, 1914 |
| 1,634,697 | Thorsby | July 5, 1927 |